United States Patent
York et al.

(10) Patent No.: US 6,777,845 B2
(45) Date of Patent: Aug. 17, 2004

(54) HIGH OUTPUT ALTERNATOR BOBBIN

(75) Inventors: Michael York, Chelsea, MI (US); Tony Militello, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/057,059

(22) Filed: Jan. 24, 2002

(65) Prior Publication Data

US 2003/0137208 A1 Jul. 24, 2003

(51) Int. Cl.[7] .............................................. H02K 3/32
(52) U.S. Cl. ..................... 310/194; 310/218; 310/261
(58) Field of Search ................................. 310/194, 218, 310/254, 257, 261, 263

(56) References Cited

U.S. PATENT DOCUMENTS

| | | | | |
|---|---|---|---|---|
| 2,949,591 A | * | 8/1960 | Craige | 336/83 |
| 3,215,877 A | | 11/1965 | Raver et al. | 310/168 |
| 3,305,740 A | * | 2/1967 | Shano | 310/42 |
| 4,720,646 A | * | 1/1988 | Torimoto | 310/71 |
| 4,902,922 A | | 2/1990 | Annovazzi | 310/61 |
| 4,987,331 A | * | 1/1991 | Horng | 310/254 |
| 5,031,745 A | * | 7/1991 | Nishimura | 192/84 T |
| 5,081,383 A | * | 1/1992 | Kusumoto et al. | 310/59 |
| 5,270,604 A | * | 12/1993 | Sandel et al. | 310/263 |
| 5,361,011 A | * | 11/1994 | York | 310/194 |
| 5,539,265 A | * | 7/1996 | Harris et al. | 310/263 |
| 5,770,900 A | * | 6/1998 | Sato et al. | 310/49 R |
| 5,943,760 A | * | 8/1999 | Barzideh et al. | 29/596 |
| 5,945,765 A | | 8/1999 | Chen | 310/257 |
| 5,973,423 A | | 10/1999 | Hazelton et al. | 310/42 |
| 6,037,694 A | | 3/2000 | Asao et al. | 310/261 |
| 6,107,719 A | * | 8/2000 | Asao | 310/261 |
| 6,225,727 B1 | * | 5/2001 | Oohashi et al. | 310/263 |
| 6,239,532 B1 | * | 5/2001 | Hollenbeck et al. | 310/257 |

FOREIGN PATENT DOCUMENTS

| | | |
|---|---|---|
| GB | 917200 | 1/1963 |
| GB | 1251792 | 10/1971 |
| JP | PJ2000203766 A * | 7/2000 |

* cited by examiner

Primary Examiner—Tran Nguyen
Assistant Examiner—Leda Pham
(74) Attorney, Agent, or Firm—Brinks Hofer Gilson & Lione

(57) ABSTRACT

An electrical alternator is disclosed having a high output bobbin. The rotor assembly of the alternator includes a bobbin assembly having an expandable split or seam through a section of the bobbin assembly, a field coil that is wrapped around the bobbin assembly, and a pole assembly having an integrated hub for receiving the field coil wrapped bobbin assembly. The bobbin assembly can consist of either a single component or multiple components. The method for constructing the rotor assembly is also disclosed.

22 Claims, 8 Drawing Sheets

HIGH OUTPUT ALTERNATOR BOBBIN

FIELD OF INVENTION

The invention relates to an automotive electrical alternator, and particularly to an alternator having a high output alternator bobbin.

BACKGROUND OF THE INVENTION

This invention is related to an electrical alternator, particularly adapted for use in motor vehicle applications including passenger cars and light trucks. These devices are typically mechanically driven using a drive belt wrapped on a pulley connected to the crankshaft of the vehicle's internal combustion engine. The belt drives a pulley on the alternator which rotates an internal rotor assembly to generate alternating current (AC) electrical power. This alternating current electrical power is rectified to direct current (DC) and supplied to the motor vehicle's electrical bus and storage battery.

While alternators have been in use in motor vehicles for many decades, today's demands on motor vehicle design, cost, and performance have placed increasing emphasis on the design of more efficient alternators. Today's motor vehicles feature a dramatic increase in the number of electrical on-board systems and accessories. Such electrical devices include interior and exterior lighting, climate control systems, increasingly sophisticated power train control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the vehicle's electrical system demands vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its mass which relates to the vehicle's fuel mileage.

In addition to the need of providing higher electrical output, designers of these devices further strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

The vast majority of all vehicles manufactured today use front-end accessory drive alternators that contain rotors that provide the alternator's magnetic field and rotate within the machine. The magnetic field is generated when the field coil of the rotor, made up of a number of insulated copper wires wrapped around the steel pole piece hub, is energized and a current flows through the wire.

It is well known that the magnetic field strength that the rotor provides is proportional to the amount of power the alternator can provide to the vehicle's systems. The field strength is increased by applying more voltage on the field coil resulting in more field current flowing through the windings. However, as the current increases in the field coil, the power dissipation in the form of heat increases at a rate that is squared due to the governing equation $P=I^2R$. A well-known challenge in the art is to dissipate more heat from the hot copper field windings to the cooler steel pole pieces. It is critical that intimate contact between the field coil, insulating bobbin and the steel hubs of the poles be achieved with the thinnest possible separation between the coil and the hubs and the tightest contact.

Reducing the thermal contact resistance is very challenging since the rotor bobbin is wound with the field coil first. Then the field coil wound bobbin is assembled onto the hub of the pole pieces. To reduce the contact resistance between the field coil, insulating bobbin, and the steel hub the inside diameter of the bobbin is tightly fit over the outside diameter of the hub. However, the liberal tolerances of the various components create a variation in the fit of the bobbin over the hub, preventing a consistently tight fit of the components. Therefore, the rotor is designed for maximum power dissipation of the field coil as though the bobbin will always have a slip fit onto the hub.

Currently, one way of dealing with this problem is to ensure a very tight fit of the bobbin and coil onto the hub of the pole. The field coil is tightly wound onto the bobbin to create a coil-bobbin assembly. The coil-bobbin assembly is press fit onto the steel hub of the pole. This requires the inside diameter of the bobbin to stretch, which in turn stretches the field coil wire. The bobbin must be made of a flexible material. The problem with this design is that during the assembly process, the steel hub tends to rub on the inside diameter of the flexible bobbin causing it to tear and pinch between the steel hub pieces. This greatly limits the amount of press fit that can be obtained with this approach and prevents acquiring the desired fit between the components.

Another reason to obtain a tight press fit of the coil-bobbin assembly onto the pole hub is to help lock the coil-bobbin assembly to the hub and prevent slip between the bobbin and hub. During the operation of the alternator, the rotor accelerates and decelerates at very high rates as the engine speed changes. This results in a rotational force on the bobbin encouraging the bobbin to break free from the steel pole pieces. A very tight press fit locks the coil-bobbin assembly in place eliminating the need for additional locking features on the bobbin that take up space that could be used for field coil wire or the steel poles.

SUMMARY OF THE INVENTION

The present invention provides a method of obtaining a very tight press fit between the coil-bobbin assembly and the pole hub without the concern of pinching the bobbin material between the pole hub surfaces. The tighter fit means substantially lower thermal contact resistance between the field coil wire, bobbin and pole hub and, therefore, much higher field coil power dissipation capability. The end result is a higher power density alternator.

The present invention resolves the problems outlined above by providing a split or expandable seam in the bobbin. This allows the bobbin to be made of a more rigid material and still expand over the pole hub. A substantial press fit between the bobbin inner diameter and hub outer diameter can be obtained using this design. The bobbin expands and stretches the field coil wire resulting in securely locking the wire to the bobbin and the bobbin to the pole hub. The bobbin can be made from a more rigid material than could be used prior to the invention. For instance, steel can be used for the bobbin with a thin insulating layer wrapped around the outside diameter to insulate the wire from the steel hub. Use of a rigid material decreases pinching between the pole hubs during assembly. Additionally, the contact force between the field coil wire, bobbin, and pole hub can be increased substantially leading to a significant improvement in heat transfer from the field coil wire. Therefore, the field coil current can be increased without fear of overheating the coil resulting in a higher power density alternator.

Use of more rigid materials for the cylindrical diameter of the bobbin also allows the rotor to be filled with more field coil windings given the same allowable space in the rotor. When the coil-bobbin is assembled onto the poles, the inside finger angle of the poles that contacts the wire tends to force the wire in an inward direction toward the shaft. The resulting force on the wire tends to push the bobbin and field coil wire into the gap between the pole pieces during the assembly process. Use of a stronger, more rigid material for the cylindrical portion of the bobbin allows a significantly higher crushing force to be applied by the undersides of the fingers onto the field coil without the field coil wire or bobbin becoming displaced in a gap. Therefore, more wire can be used to create the field coil and allow the crushing force to increase substantially without concern of pinching material between the pole pieces.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

Figure 1:
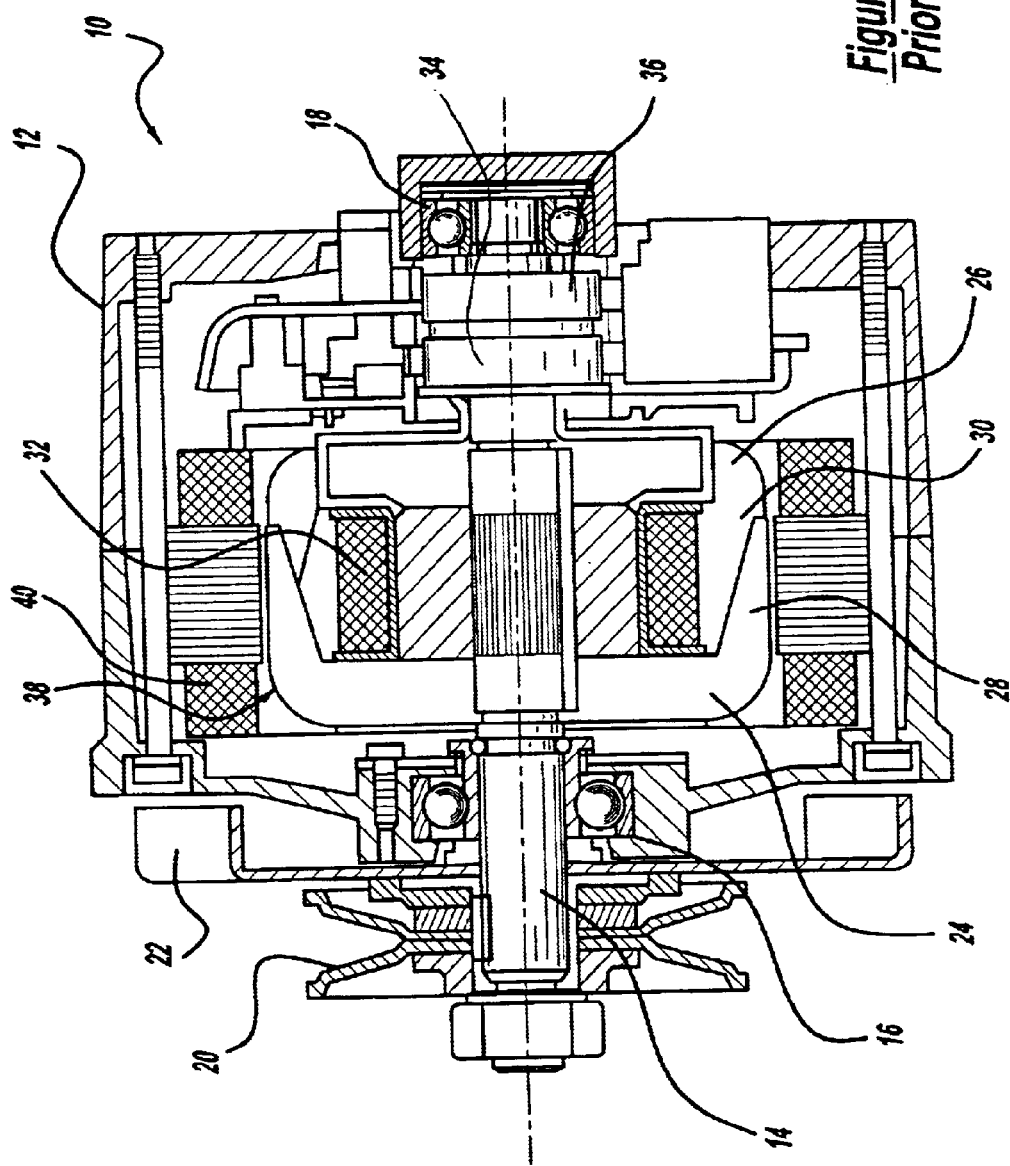
FIG. 1 is a cross sectional view of a typical prior art electrical alternator.

In order to provide a framework for a further detailed description of the preferred embodiments of this invention, FIG. 1 is presented illustrating a prior art electrical alternator configuration. That figure illustrates electrical alternator 10 enclosed with housing 12. Alternator rotor shaft 14 is supported by rolling element bearings 16 and 18. Belt driven pulley 20 is fastened to the protruding front end of rotor shaft 14. Fan 22 rotates with shaft 14 and provides cooling airflow for removing heat from alternator 10. Front and rear alternator poles 24 and 26, respectively, rotate with shaft 14 and have extending claw fingers 28 and 30, respectively. Fingers 28 and 30 interlace to create the well known "claw pole" rotor configuration. Excitation winding 32 is carried within the cavity formed between poles 24 and 26. A DC excitation signal is applied to excitation winding 32 through a pair of slip rings 34 and 36, and associated brushes.

Rotor assembly 38 which includes poles 24 and 26, winding 32, and slip rings 34 and 36, produces an alternating polarity magnetic field by rotation of the rotor assembly. Although a DC excitation signal is applied to slip rings 34 and 36, the interlacing of alternating poles 24 and 26 creates an alternating polarity magnetic field as presented to the windings of stationary core 40 located radially around rotor assembly 38. The movement of the alternating polarity magnetic field presented by rotor assembly 38 across the windings of core 40 generates electricity in a well-known manner.

Electrical energy output by electrical alternator 10 generated within core 40 is directed to rectifying diodes (not shown) and perhaps further filtering and power conditioning devices before being connected with the vehicle's electric distribution bus. Sophisticated control systems, also known as voltage regulators, are used to apply an appropriate level of DC voltage to excitation windings 32 to generate the desired RMS value of the outputted alternating current from alternator 10, which can be in single phase or multi-phase form, depending on the winding design of core 40.

Figure 2:
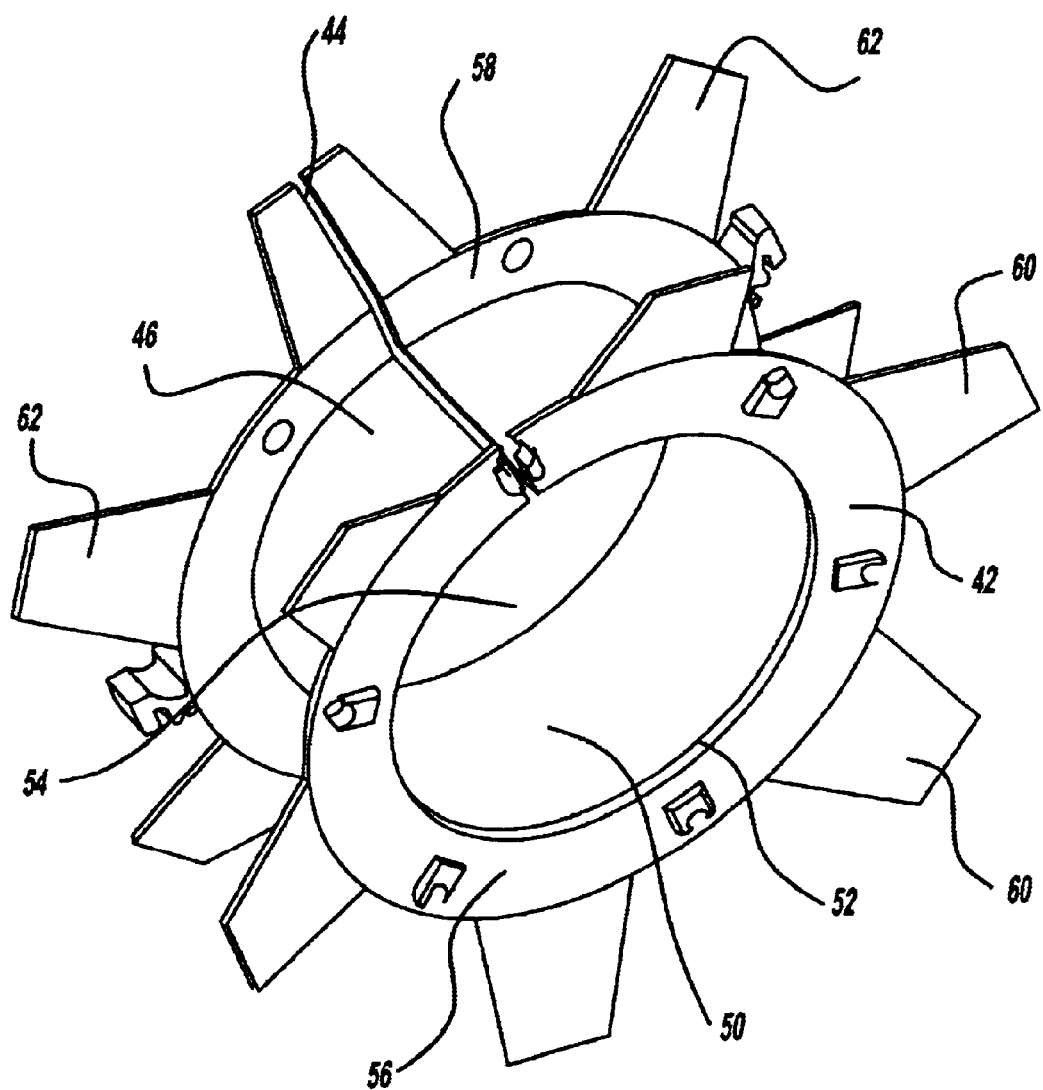
FIG. 2 is a perspective view of one embodiment of the bobbin assembly of the present invention.

The present invention specifically pertains to the rotor of the alternator assembly and even more specifically to the bobbin. One embodiment of this invention, shown in FIG. 2, is a bobbin assembly 42 for use in an alternator having a split 44 through a section of the bobbin assembly 42. The split 44 allows the bobbin assembly 42 to expand. The expandable split 44 is also considered as a slit or seam in the bobbin assembly 42.

The bobbin assembly 42 can be made from numerous materials, including but not limited to, steel and polymers. The polymers can be either injection molded or stamped. It should be noted that if the bobbin assembly 42 is made from metal, an insulating layer 46 should be positioned between the bobbin 42 and the excitation winding 48.

The bobbin assembly 42 is shown as a single piece component in this embodiment. The bobbin 42 has a cylindrical center section 50 having a first end 52 and a second end 54. A bobbin first sidewall 56 extends from the first end 52 of the cylindrical center section 50 and a bobbin second sidewall 58 extends from the second end 54 of the cylindrical center section 50. Both sidewalls 56, 58 are generally star shaped having outer flaps 60, 62 positioned around the outer periphery. The outer flaps 60 on the first sidewall 56 are misaligned with the outer flaps 62 on the second sidewall 58. The expandable split 44 is positioned through a section of the first sidewall 56, cylindrical center 50, and second sidewall 58.

Figure 3:
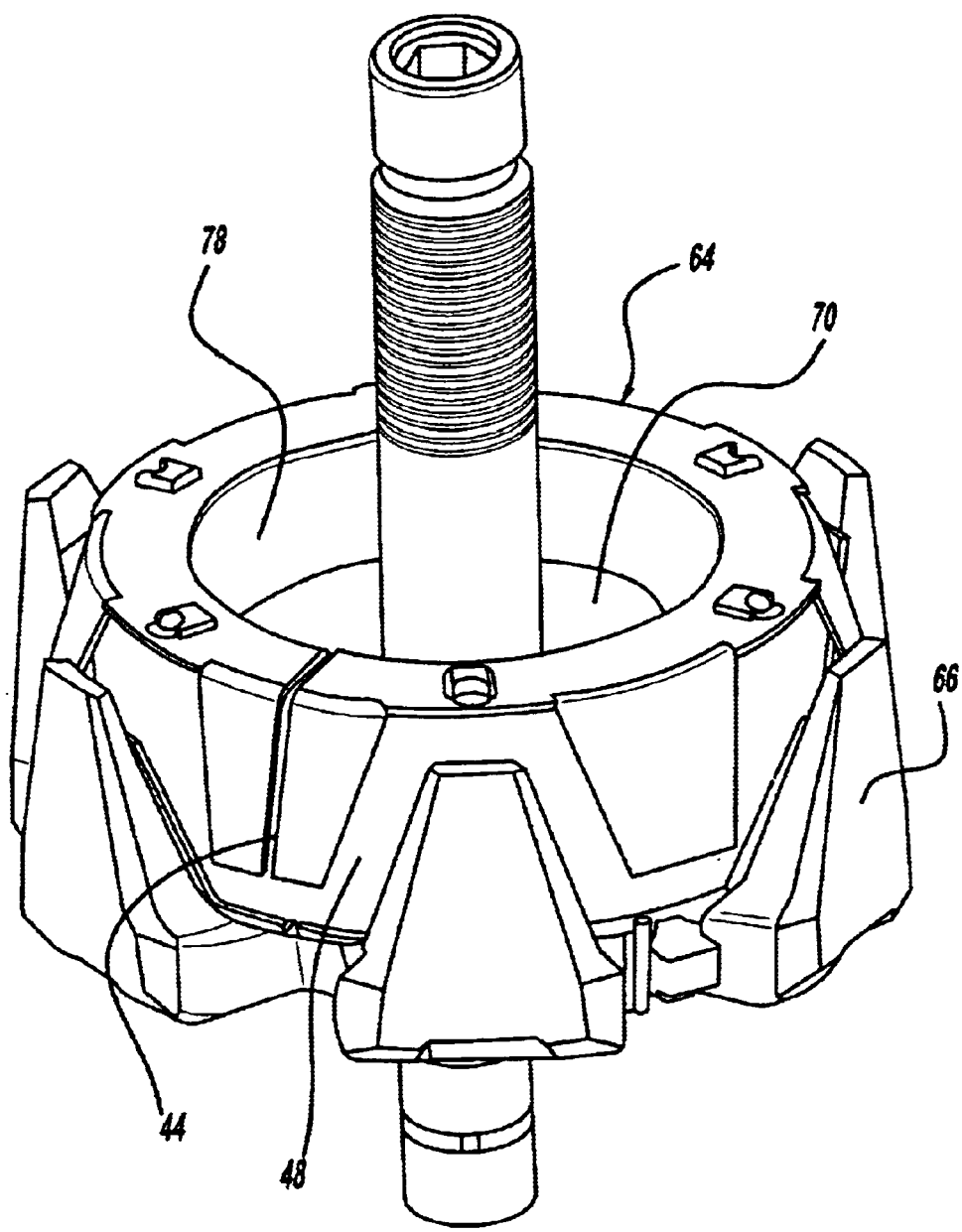
FIG. 3 is a perspective view of a partially assembled rotor assembly of the present invention.

Shown in FIG. 3, the excitation winding 48 is wound or wrapped around the bobbin assembly 42. The outer flaps 60, 62 on the first and second sidewalls 56, 58 are folded down over the excitation winding 48. The excitation winding wound bobbin is also known as the coil-bobbin assembly 64. The coil-bobbin assembly 64 is then assembled onto the first pole piece 66, which is one part of the pole assembly 68 (shown in FIG. 4.)

Figure 4:
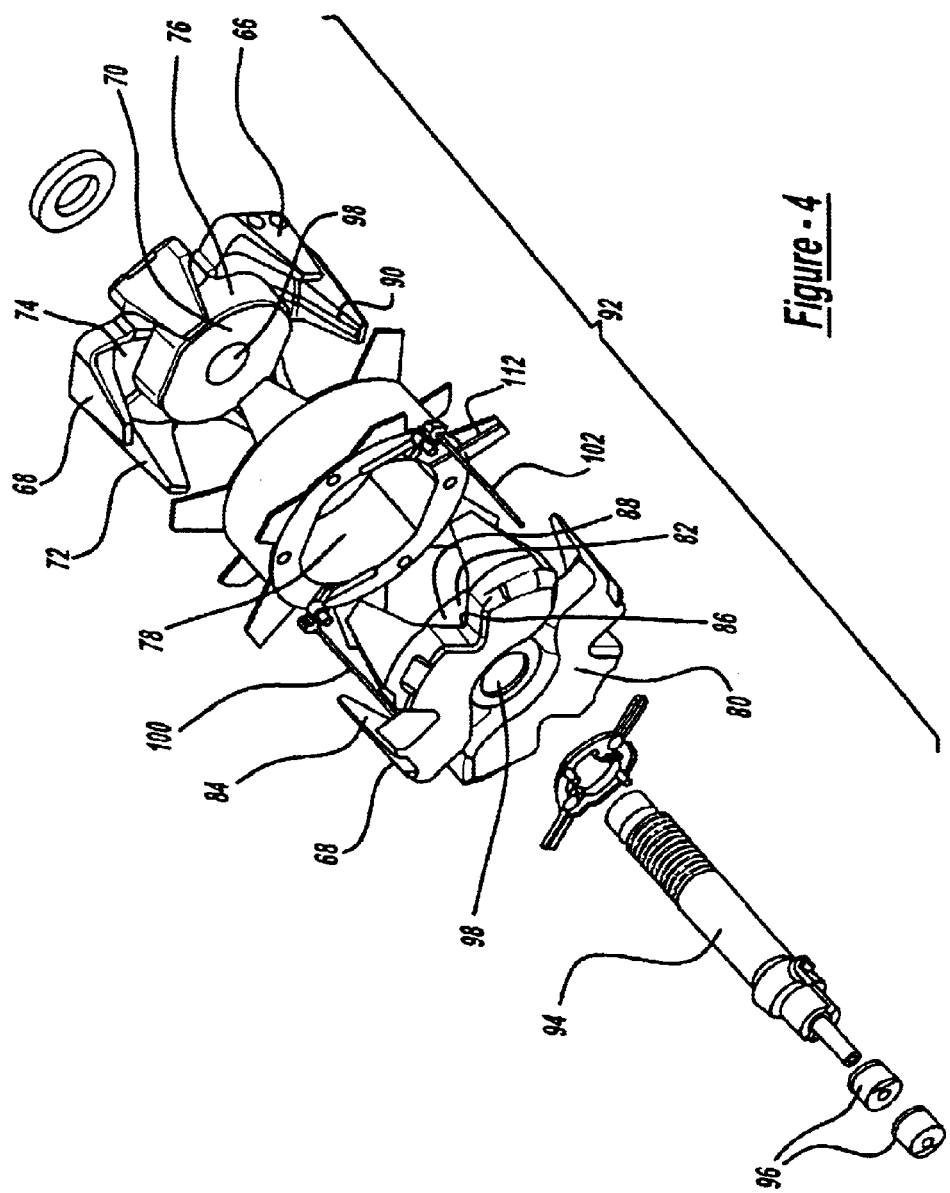
FIG. 4 is an exploded perspective view of the rotor assembly of the present invention.

As shown in FIGS. 3 and 4, the first or front pole piece 66 is generally star shaped including an integrated hub 70 in the center, fingers 72 that surround the periphery of the pole piece 66, and a valley 74 positioned between the outer diameter 76 of the hub 70 and the fingers 72. The interior diameter 78 of the bobbin cylindrical center section 50 is press fit over the outer diameter 76 of the hub section 70 and rests in the valley 74 of the pole piece 66.

There are a total of two pole pieces 66, 80, comprising the pole assembly 68. The second or rear pole piece 80 is a mirror image of the first pole piece 66. Therefore, the second pole piece also is generally star shaped including an integrated hub 82 in the center, fingers 84 that surround the periphery of the pole piece 80, and a valley 86 positioned between the outer diameter of the hub 88 and the fingers 84. The second pole piece 80 is positioned with respect to the coil-bobbin assembly 64 so that the fingers 84 are misaligned with the fingers 72 on the first pole piece 66 and press fit onto the coil-bobbin assembly 64. The pole assembly 68 could also include a groove 90 that aligns with the expandable seam 44 of the bobbin assembly 42. The groove 90 helps to prevent the excitation winding 48 from slipping into the expandable split 44.

The rotor assembly 92 also includes a shaft 94 and a slipring assembly 96. The shaft 94 is received in a bore 98 that is formed through the center of the pole assembly 68. The slipring assembly 96 is attached to the shaft 94, preferably by press fitting it to the shaft 94. The slipring assembly 96 is connected to the ends of the excitation winding 100, 102.

Figure 5:
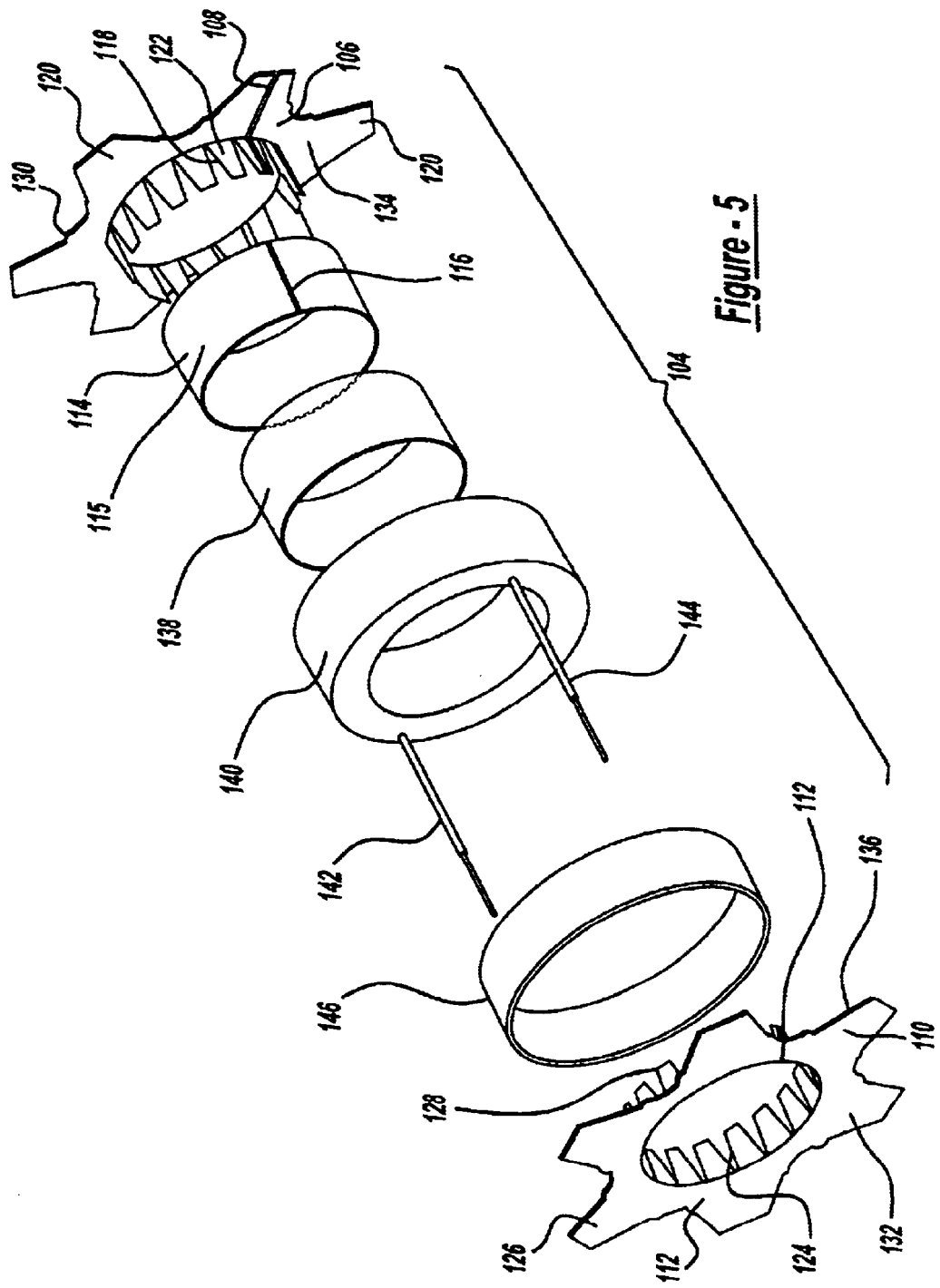
FIG. 5 is an exploded perspective view of a second embodiment of the bobbin assembly of the present invention.

A second embodiment of this invention includes a bobbin that consists of multiple components. As shown in FIG. 5, the bobbin assembly 104 comprises a first end cap 106, a second end cap 110, and a metal sleeve 114 having an expandable split 116. The first and second end caps 106, 110 are attached to a rigid sleeve 114.

The end caps 106, 110 could be made from any number of materials, including, but not limited to, a thin sheet of polymer, a composite, a cloth sheet of material, or a laminated material. One example of a laminated material is NOMEX™ MYLAR™ laminate. Further, the end caps could be formed using numerous methods, including but not limited to, stamping and molding.

Preferably, the rigid sleeve is made from metal. The metal could be steel. One way of manufacturing the sleeve is to roll a cylinder from a flat rectangular sheet of metal. The preferred range of wall thickness of the sleeve is 0.1–1.0 millimeters, but most preferably in the range of 0.20–0.30 mm.

Figure 6:
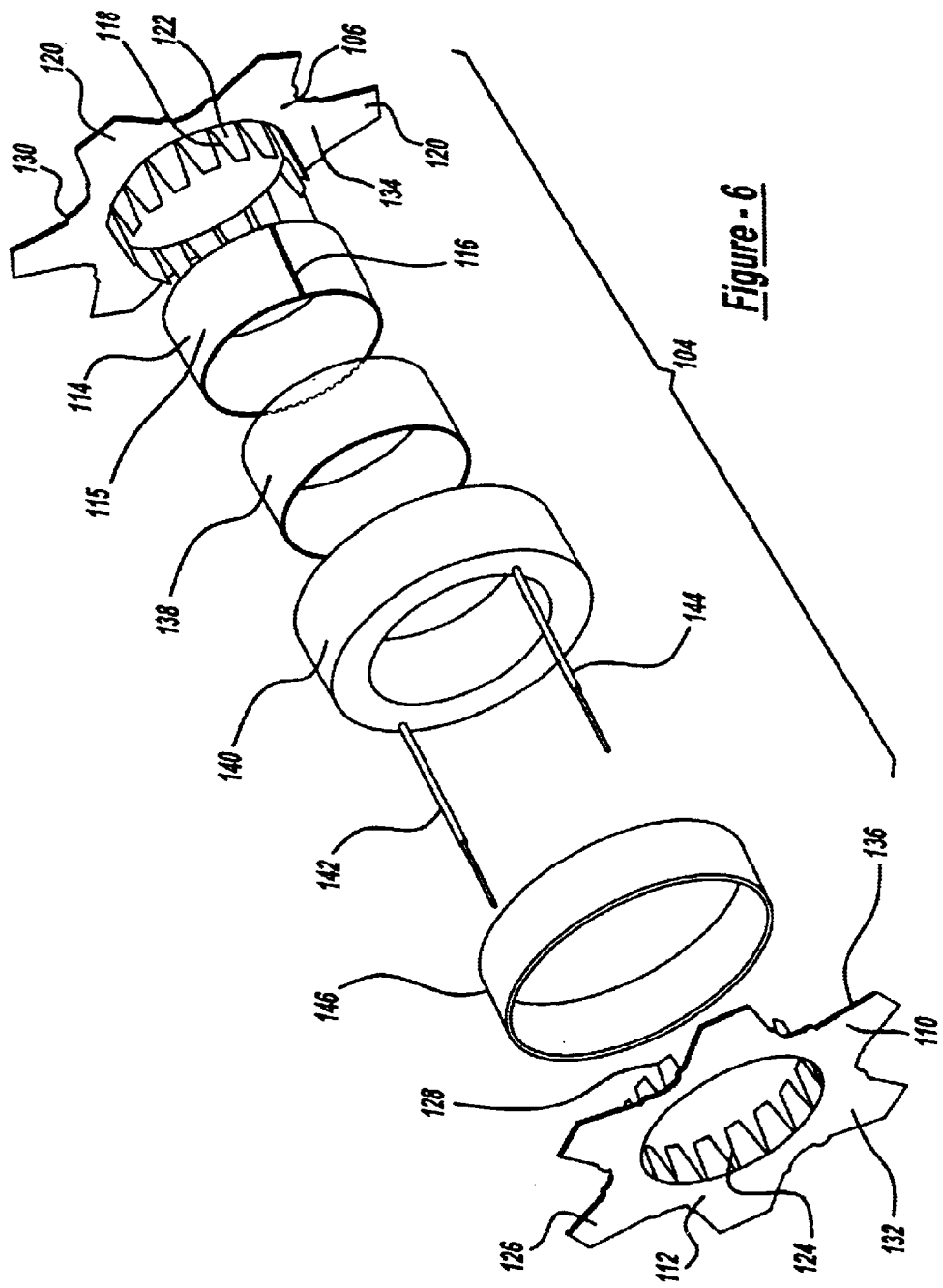
FIG. 6 is an exploded perspective view of a third embodiment of the bobbin assembly of the present invention.

In a third embodiment, shown in FIG. 6, the first end cap 106 has an expandable split 108. The second end cap 110 also has an expandable split 112. The first and second end caps 106, 110 are attached to the metal sleeve. The expandable splits 108, 112, 116 for all three components may or may not all be aligned in the final assembly.

Figure 8:
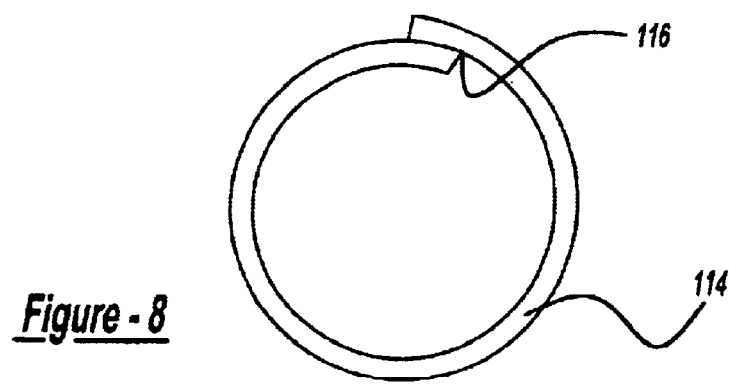
FIG. 8 is a cross sectional view of an alternative embodiment of the rigid sleeve.
Figure 9:
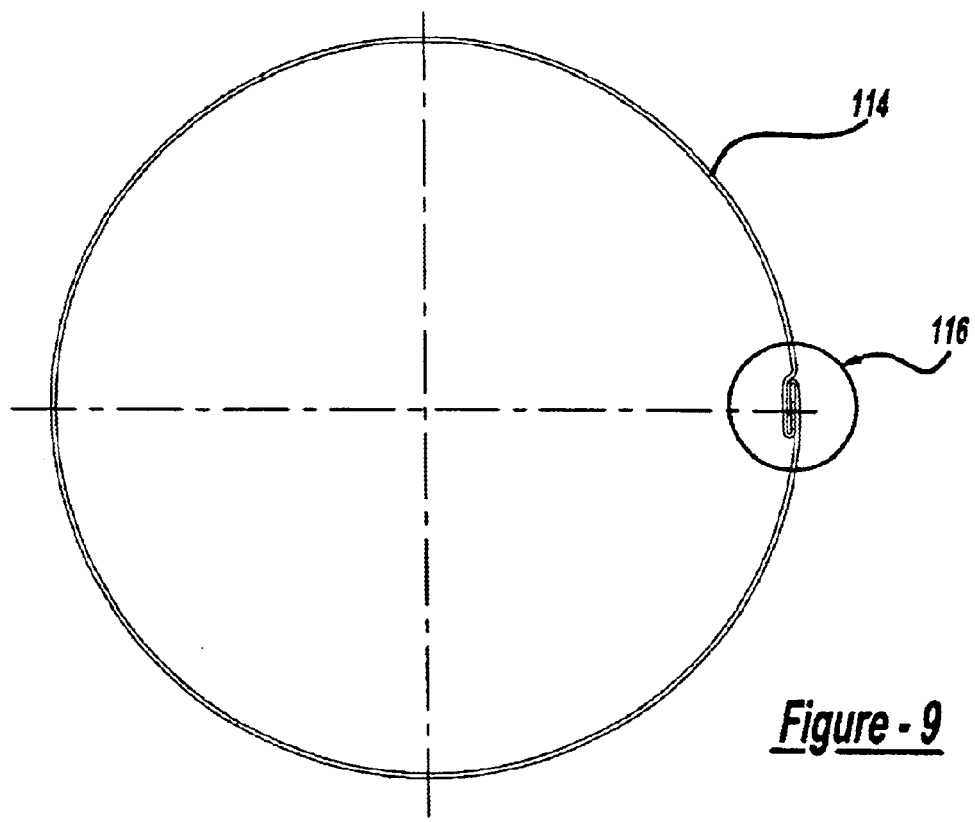
FIG. 9 is a cross sectional view of another alternative embodiment of the rigid sleeve.
Figure 10:
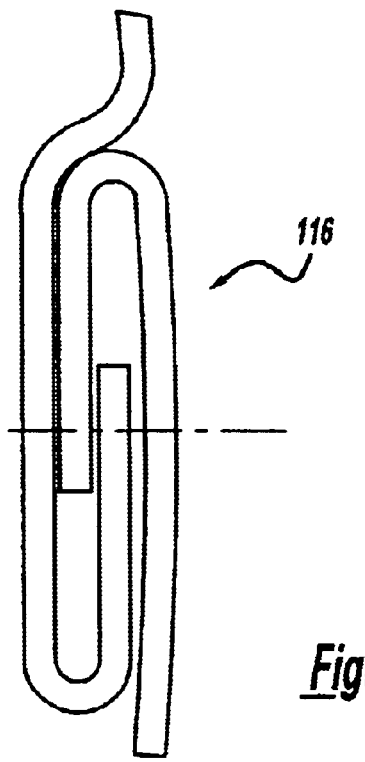
FIG. 10 is a cross sectional view of the expandable seam shown in FIG. 9.

Another possible configuration for the sleeve 114 that could be incorporated into either the second or third embodiment is a split in the sleeve 114 where the ends of the sleeve 114 overlap, as shown in FIG. 8. Yet another configuration for the sleeve 114 is shown in FIGS. 9 and 10. These configurations are referred to as expandable seams.

The first end cap 106 has a generally star shape and has a centered generally circular aperture 118. The first end cap 106 has outer flaps 120 positioned around the outer periphery and inner flaps 122 positioned around the inner periphery. Similarly, the second end cap 110 is generally star shaped and has a centered generally circular aperture 124. The second end cap 110 also has outer flaps 126 positioned around the outer periphery and inner flaps 128 positioned around the inner periphery.

Further, the first and second end caps 106, 110 each have an outward facing side 130, 132 and an inward facing side 134, 136. The inner flaps 122, 128 on both the first and second end caps 106, 110 are folded inward to fit over the metal sleeve 114. More specifically, the inner flaps 122, 128 are folded at a generally 90° angle from the inward facing side 134, 136 on both the first and second end caps 106, 110. In other words, the metal sleeve 114 is annular and defines an outside diameter 115. The inner flaps 122, 128 of the first and second end caps are positioned over the outer diameter 115 of the metal sleeve.

Once the inner flaps 122, 128 of the first and second end caps 106, 110 are positioned over the metal sleeve 114 a ring of inner tape 138 may be placed around the inner flaps 122, 128 to adhere the inner flaps 122, 128 to the metal sleeve 114.

The excitation winding 140 is preferably a continuous copper wire that is insulated. The excitation winding 140 positioned around the metal sleeve 114, first end cap inner flaps 122, second end cap inner flaps 128 and ring of inner tape 138. The first and second ends 142, 144 of the excitation winding 140 are not wound around the metal sleeve 114.

The outer flaps 120, 126 both the first end cap 106 and second end cap 110 are inwardly folded around the excitation winding 140. A ring of outer tape 146 may be wrapped around the folded outer flaps 120, 126 of the first and second end caps 106, 110 to secure the outer flaps 120, 126 in position around the excitation winding 140. This component is considered the bobbin assembly 104.

The second and third embodiments of the bobbin assembly 104 can then be press fit onto the pole assembly 68 as described for the first embodiment, similar to FIG. 3.

Figure 7:
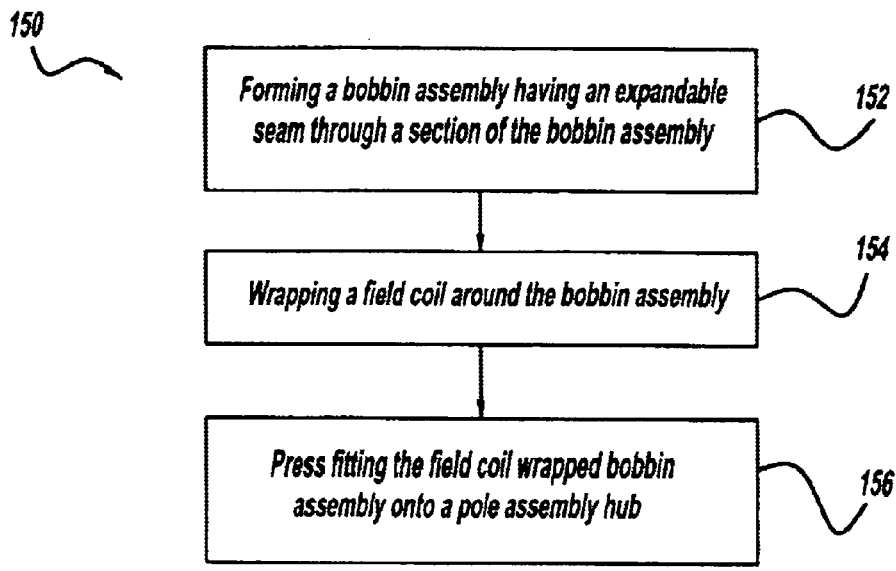
FIG. 7 is a flowchart of the method of the present invention.

As shown in FIG. 7, the method of constructing the rotor assembly of the present invention is also disclosed, shown generally at 150. The method includes forming a bobbin assembly having an expandable seam or slit through a section of the bobbin assembly, shown at 152. At 154, a field coil is wrapped around the bobbin assembly. At 156, the field coil wrapped bobbin assembly is press fit onto a pole assembly hub.

While the above description constitutes the preferred embodiment of the present invention, it will be appreciated that the invention is susceptible to modification, variation and change without departing from the proper scope and fair meaning of the accompanying claims

We claim:

1. A bobbin for use in an electrical machine comprising a bobbin having a pair of opposing end caps connected by a sleeve, the sleeve defining an expandable seam extending completely along the sleeve, the expandable seam defined by overlapping hook shaped ends of the sleeve.

2. A rotor assembly for use in an electrical machine, the assembly comprising:
   a bobbin assembly including a pair of opposing end caps connected by a sleeve, the sleeve having a split extending completely axially and completely radially through the sleeve for allowing the bobbin assembly to expand;
   an excitation winding wrapped around the bobbin assembly; and
   a pole assembly for receiving the bobbin assembly wrapped with the excitation winding, the pole assembly including a hub sized larger than the sleeve to cause expansion of the bobbin assembly wrapped with the excitation winding.

3. The rotor assembly of claim 2 wherein the pole assembly includes a front pole piece and a rear pole piece defining an integrated hub for receiving the bobbin wrapped with the excitation winding.

4. The rotor assembly of claim 2 wherein the bobbin assembly is a single piece component.

5. The rotor assembly of claim 2 wherein the bobbin assembly comprises a first end cap including the expandable split, a second end cap including the expandable split, and a rigid sleeve including the expandable split, wherein the first and second end caps are attached to the rigid sleeve.

6. The rotor assembly of claim 5 wherein the expandable splits on the first end cap, second end cap and rigid sleeve are aligned.

7. The rotor assembly of claim 5 wherein the rigid sleeve is made from metal.

8. The rotor assembly of claim 5 wherein the first and second end caps are constructed from a laminated structure.

9. The rotor assembly of claim 5 wherein the first and second end caps are constructed from a polymer.

10. The rotor assembly of claim 2 wherein the pole assembly includes a groove that aligns with the expandable split of the bobbin assembly.

11. The rotor assembly of claim 2 further comprising a shaft that is received in a bore formed in the pole assembly, and a slipring assembly attached to the shaft and in communication with the excitation winding.

12. The rotor assembly of claim 2 wherein the bobbin wrapped with the excitation winding is press fit onto the hub of the pole assembly.

13. The rotor assembly of claim 2 wherein the bobbin assembly is made from steel.

14. The rotor assembly of claim 13 further comprising an insulating layer positioned between the bobbin assembly and the excitation winding.

15. The rotor assembly of claim 2 wherein the bobbin assembly is made from an injection molded polymer.

16. A bobbin assembly for use in an electrical machine, the assembly comprising:
 a first end cap;
 a second end cap;
 a rigid sleeve having an expandable split;
 the first end cap and second end cap being attached to the rigid sleeve and not unitarily formed with the sleeve;
 an excitation winding wrapped around the bobbin assembly; and
 a pole assembly including a front pole piece and a rear pole piece, the pole assembly including an integrated hub for receiving the bobbin assembly wrapped with the excitation winding, the integrated hub sized larger than the sleeve to cause expansion of the bobbin assembly wrapped with the excitation winding.

17. The bobbin assembly of claim 16 wherein the first end cap has an expandable split and the second end cap has an expandable split.

18. The bobbin assembly of claim 16 wherein the first and second end caps are constructed from a laminated structure.

19. The bobbin assembly of claim 16 wherein the first and second end caps are made from a polymer.

20. The bobbin assembly of claim 16 wherein the rigid sleeve is made of metal.

21. The bobbin assembly of claim 16 wherein the pole assembly includes a groove that aligns with the expandable split of the rigid sleeve.

22. The bobbin assembly of claim 16 wherein the bobbin wrapped with the excitation winding is press fit onto the hub of the pole assembly.

\* \* \* \* \*